(12) United States Patent  
Goff et al.

(10) Patent No.: US 8,909,796 B2
(45) Date of Patent: Dec. 9, 2014

(54) STORAGE PROCEDURES FOR APPLICATION SERVER SESSION PERSISTENCE

(75) Inventors: Robert Everett Goff, Cary, NC (US); Stephen Joseph Kenna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 12/831,192

(22) Filed: Jul. 6, 2010

(65) Prior Publication Data

US 2012/0011258 A1 Jan. 12, 2012

(51) Int. Cl.
*G06F 15/16* (2006.01)
*H04L 29/08* (2006.01)

(52) U.S. Cl.
CPC ......... *H04L 67/142* (2013.01); *H04L 29/08252* (2013.01); *H04L 29/08576* (2013.01); *H04L 67/1027* (2013.01)
USPC .......................................... 709/228; 709/205

(58) Field of Classification Search
CPC ................. H04L 29/08252; H04L 29/08576; H04L 67/1027; H04L 67/142
USPC ........................................ 709/205, 227, 228
See application file for complete search history.

(56) References Cited

U.S. PATENT DOCUMENTS

| | | | |
|---|---|---|---|
| 6,865,576 B1 | 3/2005 | Gong et al. | |
| 7,177,878 B2 * | 2/2007 | Wason | 1/1 |
| 7,526,476 B2 * | 4/2009 | Naam et al. | 1/1 |
| 7,761,435 B2 | 7/2010 | Stanev et al. | |
| 7,840,288 B2 * | 11/2010 | Graepel et al. | 700/93 |
| 7,853,698 B2 | 12/2010 | Stanev et al. | |
| 8,024,439 B2 * | 9/2011 | Nalla et al. | 709/223 |
| 2003/0177187 A1 * | 9/2003 | Levine et al. | 709/205 |
| 2006/0143224 A1 * | 6/2006 | Simeonov | 707/103 R |
| 2009/0106210 A1 | 4/2009 | Slezak et al. | |
| 2009/0193006 A1 | 7/2009 | Herrnstadt | |
| 2011/0196977 A1 * | 8/2011 | Lynch et al. | 709/229 |

* cited by examiner

*Primary Examiner* — Brian K Gillis
(74) *Attorney, Agent, or Firm* — Grasso PLLC; Fred Grasso

(57) ABSTRACT

Session persistence storage schemes are provided. These schemes may include identifying a change in a session attribute for an application client session, querying a session persistence table associated with the application running in the application-server environment, and updating an attribute in the record identified by the query of the session persistence table, where the query is made to a session persistence table with session attributes grouped by common traits.

22 Claims, 5 Drawing Sheets

| | | | | |
|---|---|---|---|---|
| JAVASERVERFACE APPLICATION | JSF-USER2-1A | JSF APPLICATION | 2010-06-22-1618 | |
| JAVASERVERFACE APPLICATION | JSF-USER2-1A | JSF WIDGET A | | JSF WIDGET A (OUTPUT SETTINGS; HEADER SETTINGS; FOOTER SETTINGS; ETC.) |
| JAVASERVERFACE APPLICATION | JSF-USER2-1A | JSF WIDGET B | | JSF WIDGET B (SESSION ANNOTATIONS; SESSION DEFINITIONS; SESSION COPY/PASTE OPERATIONS; SESSION SELECTIONS) |
| JAVASERVERFACE APPLICATION | JSF-USER3-1A | JSF APPLICATION | 2010-06-22-1620 | |
| JAVASERVERFACE APPLICATION | JSF-USER3-1A | JSF WIDGET A | | JSF WIDGET A (OUTPUT SETTINGS; HEADER SETTINGS; FOOTER SETTINGS; ETC.) |
| JAVASERVERFACE APPLICATION | JSF-USER3-1A | JSF WIDGET B | | JSF WIDGET B (SESSION ANNOTATIONS; SESSION DEFINITIONS; SESSION COPY/PASTE OPERATIONS; SESSION SELECTIONS) |
| WORD PROCESSOR | WP-USER1-1A | WORD PROCESSOR | 2010-06-22-1734 | |
| WORD PROCESSOR | WP-USER1-1A | WP ATTRIBUTES | | ATTRIBUTES (DEFAULT BACKGROUND OUTPUT SETTINGS; DEFAULT HEADER OUTPUT SETTINGS; DEFAULT FOOTER OUTPUT SETTINGS; USER DEFINED SESSION ATTRIBUTE; USER SELECTED SESSION ATTRIBUTE; USER REJECTED SESSION ATTRIBUTE; USER SESSION INPUT DATA; APPLICATION SESSION INPUT DATA; QUERY RESULTS INPUT DATA) |

CONTINUED FROM FIG 1A 

FIG. 1B

STORAGE PROCEDURES FOR APPLICATION SERVER SESSION PERSISTENCE

BACKGROUND

The present invention relates to the session persistence of network applications. More particularly, session attributes are selectively grouped in stored session persistence database records.

Maintaining an unbroken network connection in a client-server application environment reduces the risk of data loss and reduces the inconvenience of reestablishing network connectivity to server applications. Network connections are not, however, always persistent. Wireless network connectivity between client and server, and wired connectivity between client and server, may be lost for various reasons including radio-communication interference, network-cable interference, and client hibernation or shut down.

Bridging network down time and unwanted connectivity losses, so as to avoid the inconvenience of re-logging into the network or the loss of application data, may generally be referred to as session persistence. Session persistence may be maintained by various methods including packet-forwarding hardware and infrastructure software. The hardware solutions may include physical network infrastructure storing and forwarding packets in a prescribed manner. The infrastructure software solutions may include software acting as a proxy for information exchanged between an application server and a client.

Embodiments of the invention may be directed to storing and retrieving session persistence information. Methods, procedures, articles of manufacture, and devices embodying the invention may identify attributes of a session and selectively group the attributes such that session persistence table maintenance may be improved.

BRIEF SUMMARY

Methods, apparatus, and articles of manufacture may be included in embodiments of the invention. These embodiments can include articles of manufacture, computers, and methods that manage application server session persistence. The various exemplary instructions, methods, and steps may include: identifying a change in a session attribute value for an application client session, the application running in an application-server environment; querying a session persistence table associated with the application running in the application-server environment, the query to identify a record having the identified changed session attribute; and updating an attribute value in the record identified by the query of the session persistence table, wherein the query is made to a session persistence table with session attributes grouped by common traits.

In further embodiments, the record may be serialized after an updated attribute is received and one or more common attribute traits may be identified from a plurality of session attributes.

Still further, embodiments may also include grouping similar attributes, in other words, attributes identified as sharing one or more common traits. These grouped attributes may be used in the session persistence table. In some embodiments, the common traits for grouped attributes may include a shared range of estimated time needed to serialize the grouped attribute.

As provided and taught herein, these and other embodiments of the invention are possible.

DETAILED DESCRIPTION

Figure 1A:
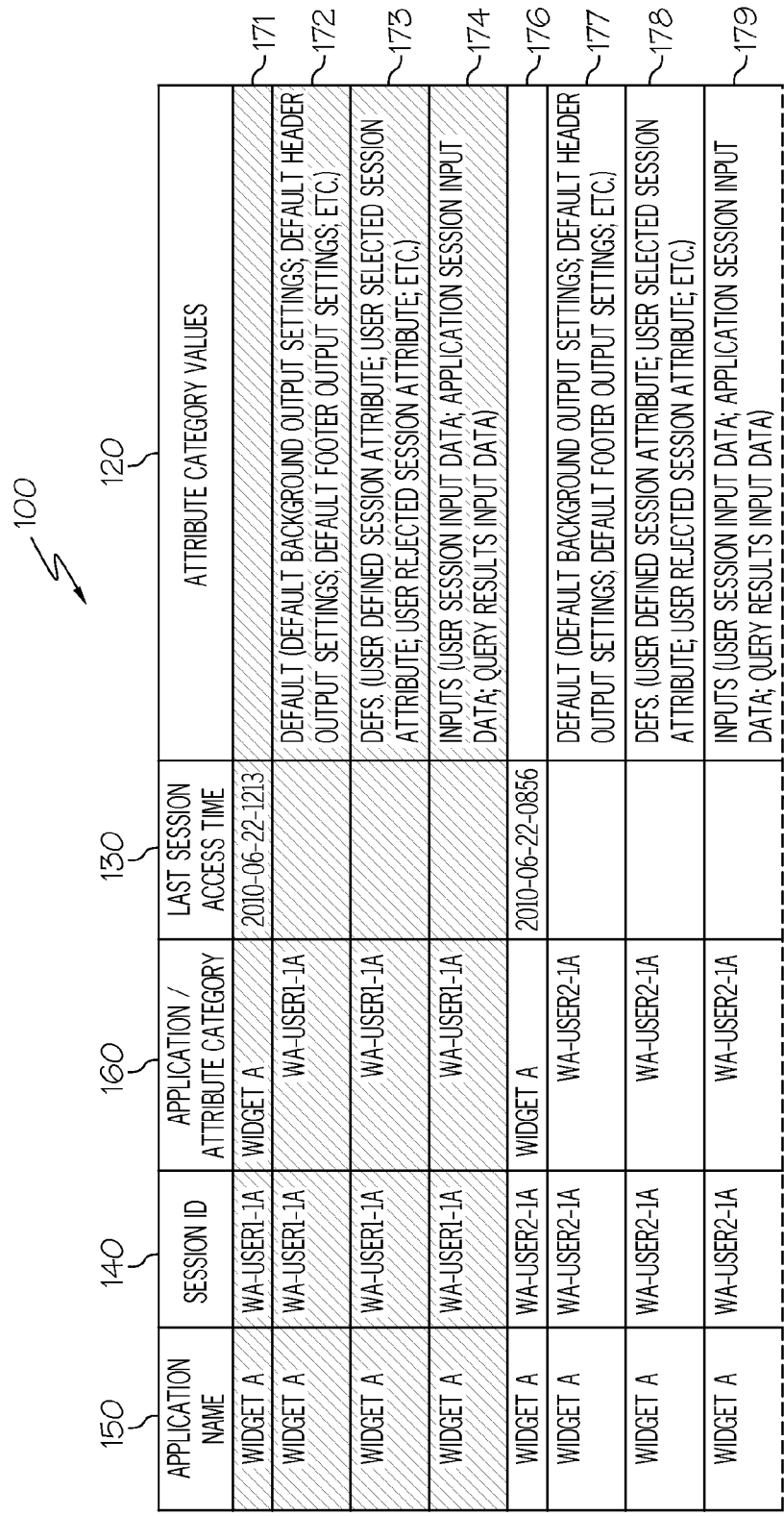
FIG. 1 shows a session persistence table having session IDs, grouped attributes, and access times, in accord with embodiments of the invention.

Embodiments include systems, methods, apparatus, and articles of manufacture that selectively group attributes of a session and the associated values of these attributes, such that session persistence table maintenance and/or storage may be provided. In embodiments, session attributes having common traits may be grouped together to provide efficiencies associated with the query and storage of updated session persistence records. These common attribute traits may include similar application background data, attribute selections made by clients using the application, attribute selections made by administrators selections made by clients using an application, settings rejected by clients during a session, page fragments or composite components, and partial page settings. Attributes sharing other traits may be grouped together as well.

In embodiments, an algorithm may provide for the grouping of session attribute traits and in embodiments the traits may be grouped based upon settings from a client and a system administrator. For example, in embodiments, session attributes may be grouped with each other such that a probability exists that grouped attributes may have similar probabilities for being updated during an ongoing server session. In so doing, when a session record is updated to accommodate a change in a session, unchanged attributes may be less likely to be rewritten with the same information. Accordingly, unchanged attributes may be present in a different session record, a record that does not contain a changing session attribute.

In embodiments, each time a session attribute is updated in a record, the record may be serialized before the record is stored in a session persistence database. In embodiments, grouping attributes with similar update tendencies or histories may assist in reducing the number of records that may be serialized when a session attribute is updated and may assist by reducing the overall number of records in a session persistence database. A reduction in the number of serializations or the length of the records to be serialized prior to storage may have positive impacts on system speed and session persistence accuracy. Also, by grouping attributes, the number of queries that may be performed to locate session records for updating may be reduced. There may be other advantages as well.

In embodiments, a session database accessible over a network may be maintaining session persistence records for multiple applications, across multiple users, and across multiple application servers. The stored session data may allow session information to be retrieved for use by different users and for use by different application servers. In embodiments, for example, a client may be routed to a second application server relying on retrieved session data to maintain the session.

Performance benefits may be experienced when session storage techniques that embody the invention are used. In embodiments, session attributes may be intelligently grouped in multi-row arrays for improved query, serialization, and storage. The intelligent grouping may reduce the number of records to be updated to maintain current session information and may promote fewer queries of session records when session persistence is being maintained. This reduction in updates may serve to reduce the amount of or time for serialization and deserialization to store and retrieve session data. Likewise, by grouping session attributes intelligently, identifying records to be updated may be performed with fewer queries than had the attributes not been grouped.

In embodiments, a storage procedure may be to group like attributes together and provide a grouping solution having the fewest queries and the fastest performance. Thus, an algorithm may be employed to group attributes. Likewise, changes in attributes may be tracked to provide empirical analysis when grouping attributes. In other words, in embodiments, the grouping of the attributes may be completed through manifest information in the application or through one or more intelligent autonomic learning algorithms. For example, if an application needed to store attributes a, b, c, d, e, and f, for proper session persistence, an autonomic storage algorithm may associate a, b, and c as a group and attributes d, e, and f as a group. Subsequent to this, when a request is made to update attributes a, b, and c all attributes (a, b, c, d, e, and f) need not be serialized.

FIG. 1 provides a session persistence table 100 in accord with embodiments of the invention. This session persistence table 100 may include multiple columns and multiple rows. These columns and rows may be updated with current session information as may be needed to maintain consistency or session persistence for an application being provided by a server. As can be seen in the session persistence table 100 column 150, server applications can include widgets, word processors, and JavaServer$^{SM}$ Faces page applications. Other applications may be used as well.

The session persistence table 100 may maintain various types of information including the application name, shown in column 150, a specific session ID associated with a specific session that is being tracked, shown at column 140, a last-session access time, reflected in column 130, attribute values, shown in column 120, and attribute categories, shown in column 160. Two or more rows in the session persistence table 100 may be associated with a single user using a single application. In other words, a single user session may be stored across multiple rows—a primary row showing last access time and secondary rows reflecting attribute categories and values for the attributes in the defined attribute categories. Thus, multiple rows may be necessary or may be tracked for a single user session.

The number of rows that may be allocated to track a session for a user may depend on how attributes for that session may be grouped. For example, if attributes for the session may be grouped in three categories, four records may be associated with the session. Rows 171-174 show such an example. Primary row 171 has the time the last session value was saved while rows 172-174 reflect the attribute category groupings and the values for each grouping. Likewise, if the attributes may not be broken down into groups, a single row may contain the attributes for a session. Row 192 shows such an example.

In session persistence table 100, Widget A is being used by user 1 and the attribute groups for the session for this user are shown in column 160, rows 172-174. As can be seen in column 160, row 172, session attributes for WA-Default regard default settings for the session. These default settings include default background output settings, default header output settings, and default footer output settings. Other default settings may be placed in this group as well. WA-Defs. of column 160, row 173, shows user-defined or user-selected attributes grouped for the session. As can be seen in row 173, the grouped attributes may include user-defined session attributes, user-selected session attributes, user-rejected session attributes, as well as other session attributes having similar traits. Lastly, row 174 shows that specific user input data, application data generated for the user, and query results of input data, may also be grouped.

In embodiments, as a session continues, the attributes of these various groups may be updated as necessary to maintain session persistence. A query may be performed when an attribute changes in order to find the record and applicable column where the attribute is stored. After identifying the applicable record, the updated attribute information may be stored. Also, when information for an attribute of a group is updated, the last session access time for that record may be updated as well. When the access time or attribute is updated, a serialization of the record may then be completed. This serialization may be needed in order to store and update the session persistence table. This last session access time may be saved in a primary row associated with each of the secondary rows. In FIG. 1, Row 171 is a primary row while Rows 172-174 are secondary rows.

Also shown in the session persistence table 100 are sessions associated with a word processor and a JavaServer$^{SM}$ Faces page application. Consistent with the discussion of Widget A above, the records in rows 176-179, 181-183, 186-188, and 191-192 may likewise be updated in accord with the scheme described above. For example, with respect to record 192, which contains a attribute category for the session, when background output settings, header output settings, or footer output settings are updated, the last session access time may also be updated in the row 191 and the rows 191 and 192 may be serialized for subsequent storage.

Rows or records 182 and 183 show that an application may be spread across multiple rows as the attributes for the application have been placed in one of two groups. Many more records may be present in the session persistence table. These additional records may reflect further groups of attributes for the sessions in the table as well as new sessions not shown in the table.

Figure 2:
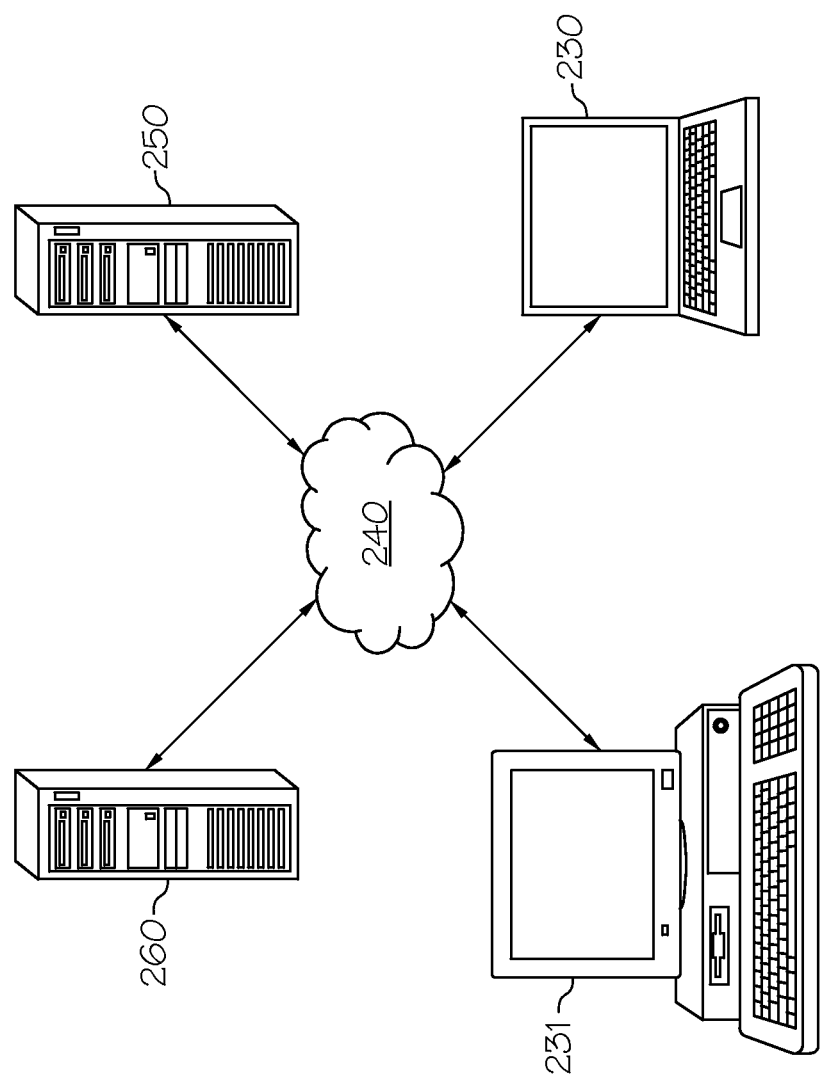
FIG. 2 shows a networked system as may be employed for grouping session attributes in accord with embodiments of the invention.

FIG. 2 shows a network system that may employed in accord with embodiments of the invention. As can be seen, the system may include a session persistence database 260 connected to a network 240, which is also connected to application server 250, and clients 230 and 231. Consistent with the discussion herein, client 230 and 231 may be running applications on server 250. A session persistence table may be stored on the application server 250 or may be remotely stored on the session persistence database 260. In either event, as the application is run on the clients, the session persistence table may be updated on a periodic or contemporary basis. The database 260 may be self-monitoring and may be monitored by the server 250 as well. In so doing, should network connectivity be lost, a previous and formerly ongoing session may be restored for the client. Likewise, there may be other advantages for maintaining session persistence as well. These can include switching between applications and switching users.

Figure 3:
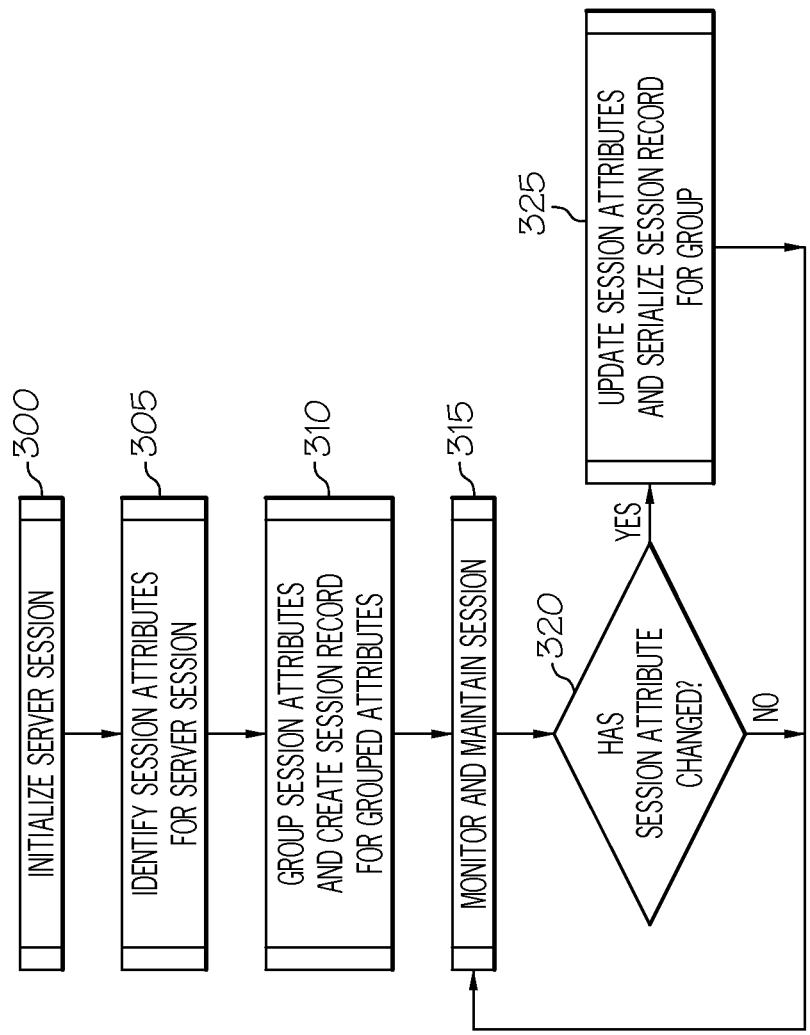
FIG. 3 shows a method as may be employed while maintaining session persistence in accord with embodiments of the invention.

FIG. 3 shows actions that may be undertaken in accord with embodiments of the invention. These include, as shown at 300, initialization of a server session. After initialization, session attributes for the server session may be identified, as shown at 305. These session attributes may be grouped and a session record created based upon these groupings. These groupings may require that three or four records be created for a single session, a single record be created for single session, and that other record schemes may be created as well. As shown at 315, the session may be monitored and the attributes updated accordingly to maintain session persistence. As attributes change, as shown at 320, the session information may be serialized and stored only for the groups affected. This monitoring and updating of selected records, only containing groups of attributes that are updated, may continue until the session is finalized or closed. In embodiments, when an attribute is modified, the record retaining that attribute may be updated and the record retaining the session access time may be updated as well. if these records are maintained in single arrays, each array may then be serialized, thus reflecting the updated information.

Figure 4:
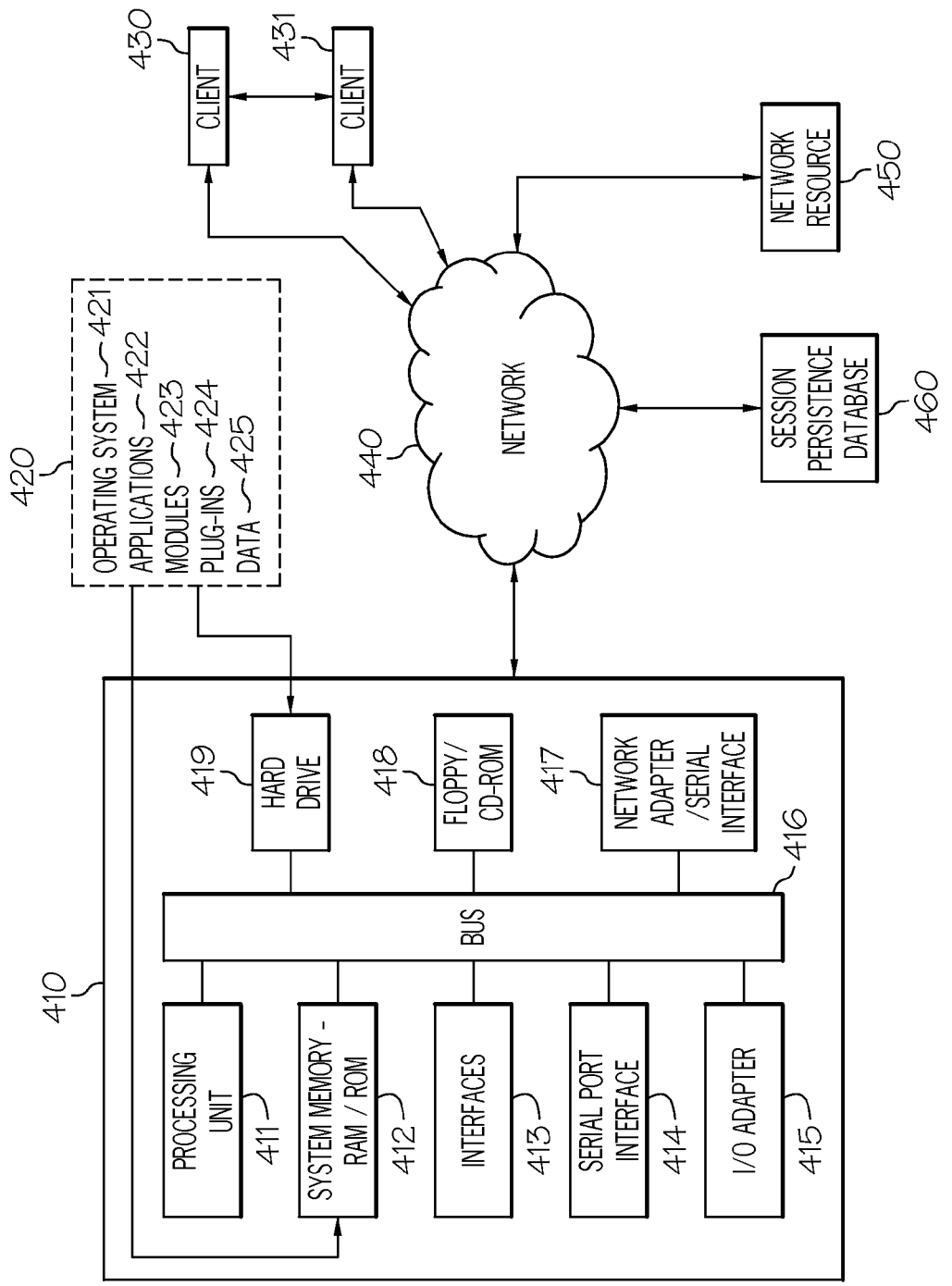
FIG. 4 shows a networked system as may be employed when grouping session attributes in accord with embodiments of the invention.

FIG. 4 shows an application server session persistence database, network resources, and clients as may be employed in systems embodying the invention. As can be seen, clients 430 and 431 may be connected to network 440. Likewise, network resource 450, application server 410, and session persistence database 460, may also be connected to network 440. These network connections may facilitate communication among and between these various client resources and servers. In the embodiment of FIG. 4, as well as in other embodiments, the session persistence database 460 may be maintained separately from the application server as well as being part of the application server 410. As can be seen in FIG. 4, the application server 460 may contain a processing unit 411, system memory 412, interfaces 413, serial port interfaces 414, an I/O adapter 415, a hard drive 419, removable storage 418, and network adapters 417. These components may be connected among and between themselves via a bus 416. Stored on the hard drive 419, and the system memory 412, may be an operating system, various applications, modules plug-ins, and applicable data. The application server 410 in FIG. 4 may be providing the widgets, word processor, and JavaServer$^{SM}$ Faces applications described in FIG. 1. The application server 410 may be providing other applications as well.

As described above, the session persistence database 460 may contain the session persistence table 100 of FIG. 1. The session persistence table maintained on the session persistence database may be maintained consistent with the discussion above. The database 460 may be maintained with other steps and/or methods as well.

In embodiments, as noted, attributes may be grouped intelligently using various methods or schemes. In embodiments, if a page author knows that three or more session attributes can be changed only upon a specific page request, and that page is the only one that could perform an update, each of the other pages may only perform GETs for these same session attributes. Thus, here, as well as with other embodiments, by grouping attributes together in a session table, the performance for other updates in the session may increase as unchanged attributes need not be serialized/deserialized and the number of queries to find changed record locations may be reduced.

In embodiments, a page author may know that they will be performing partial page updates using known AJAX techniques. If there were session attributes being used in that partial page update, the page author may choose to group those attributes for this new optimal storage procedure and create the proper metadata in their application to configure it as such. In a JavaServer$^{SM}$ Faces view, a JavaServer$^{SM}$ Faces page author may choose to group each composite component's state as a set of session attributes rather than store these attributes individually. Page fragments and composite components, which may be used within other JavaServer$^{SM}$ Face pages, may be values of categories tracked in embodiments.

The fields may be competed in various computing environments including locally, on individual clients, over shared networks, and over virtual-private-networks as well. Likewise various programming schemes may be used to carry out embodiments. This may include preparing Java$^{SM}$ Virtual Machines, JavaServer$^{SM}$ Pages, and servlets, as well as in non-Java$^{SM}$ environments.

In embodiments existing metadata may be used to locate, define, and group attributes. In embodiments, attributes may be grouped according to time between access, size, serialization time, common threading mechanisms, and other methods as well. In embodiments, clients may be mobile clients, thick client, thin client, web browsers, and others as well. Still further, the initial grouping selection may be done by network administrators configuring the applications as well as automatically based upon criteria identified herein or other criteria as well. As discussed above last access time may be queried and updated as such action as session attributes.

In embodiments, as discussed above, various methods and criteria may be used to group attributes. Further examples of these criteria or traits include: grouping JavaServer$^{SM}$ Faces Widget attributes that define the state or configuration; JavaServer$^{SM}$ Faces 2 partial page attributes and child tags within the attributes; grouping by the requesting servlet; grouping by the User Interface and what can be seen on the glass; grouping by AJAX tags on JavaServer$^{SM}$ Faces; grouping by the number of users of the attribute; grouping by the size of the attribute; grouping by the attribute serialization processing time; and grouping by XML tags. Other grouping methodologies and filters may be used as well.

While it is understood that the process software embodying the invention may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. An article of manufacture comprising:
    a non-transitory computer readable medium, the computer readable medium storing instructions thereon for managing application server session persistence, the instructions, which when executed, promoting actions comprising:
        managing records in a session persistence table for an application client session running in an application server environment, the managing including grouping two or more attributes of a first record by shared distinguishing traits of the attributes, which when the attributes are grouped together, reduce the number of serializations for storing the first record or the length of the first record to be serialized;
        identifying a change in a session attribute for the application client session;
        querying the session persistence table associated with the application running in the application server environment, the query to identify a record having the identified changed session attribute; and
        updating an attribute in the first record identified by the query of the session persistence table.

2. The article of claim 1, wherein the traits comprise one or more of the following: application background data; a selection made by a client; a selection made by an administrator; a setting rejected by a client during a session; page fragments; or partial page settings.

3. The article of claim 1 storing instructions, which when executed, further comprise:
    identifying one or more common attribute traits from a plurality of session attributes; and
    grouping attributes identified as sharing one or more common traits, the grouped attributes for use with the session persistence table.

4. The article of claim 1 storing instructions, which when executed, further comprise:
    using an autonomic learning algorithm for grouping attributes of the first record for improved querying or serialization or storage of the first record.

5. The article of claim 3 wherein the common traits for grouped attributes include a shared range of time required to serialize the grouped attribute.

6. The article of claim 1, wherein the first record is an array containing a plurality of rows associated with the application session.

7. The article of claim 6 wherein the rows contain groupings of session attributes, the session attributes sharing one or more traits and wherein the grouping of attributes further comprises grouping by: time between access and serialization time, and common threading mechanisms.

8. The article of claim 1, wherein a system administrator identifies traits by which session attributes are grouped, the traits identified before the initiation of the session in which the attributes are grouped according to the trait.

9. A method comprising:
    managing records in a session persistence table for an application client session running in an application server environment, the managing including grouping two or more attributes of a first record by shared distinguishing attribute traits, which when the attributes with the shared distinguishing trait are grouped together, reduce the number of serializations for storing the first record or the length of the first record to be serialized;
    identifying a change in a session attribute for the application client session;
    querying the session persistence table associated with the application running in the application server environment, the query to identify a record having the identified changed session attribute; and
    updating an attribute in the first record identified by the query of the session persistence table.

10. The method of claim 9 wherein the traits comprise one or more of the following: application background data; selection made by a client; selection made by an administrator; setting rejected by a client during a session; page fragments; or partial page settings.

11. The method of claim 9 further comprising:
    identifying one or more common attribute traits from a plurality of session attributes; and
    grouping attributes identified as sharing one or more common traits, the grouped attributes for use with the session persistence table.

12. The method of claim 11 wherein the common traits for grouped attributes include a shared range of time required to serialize the grouped attribute.

13. The method of claim 9 further comprising:
    using an autonomic learning algorithm for grouping attributes of the first record for improved querying or serialization or storage of records in the sessions persistence table.

14. The method of claim 9 wherein the first record is an array containing a plurality of rows associated with the application session.

15. The method claim 14 wherein the rows contain groupings of session attributes, the session attributes sharing one or more traits.

16. The method of claim 9 wherein a system administrator identifies traits by which session attributes are grouped, the traits identified before the initiation of the session in which the attributes are grouped according to the trait.

17. A computer comprising:
    a non-transitory computer readable medium, the computer readable medium storing instructions thereon for managing application server session persistence, the instructions, which when executed, promoting actions comprising:
        managing records in a session persistence table for an application client session running in an application server environment, the managing including grouping two or more attributes of a first record by shared distinguishing traits of the grouped attributes, which when grouped together, reduce the number of serializations for storing the first record and the length of the first record to be serialized;

identifying a change in a session attribute for the application client session;

querying the session persistence table associated with the application running in the application server environment, the query to identify a record having the identified changed session attribute; and updating an attribute in the first record identified by the query of the session persistence table.

18. The computer of claim 17 wherein the traits comprise one or more of the following: application background data, a selection made by a client, a selection made by an administrator, a setting rejected by a client during a session, page fragments, or partial page settings.

19. The computer of claim 17 storing instructions, which when executed, further comprise:

identifying one or more common attribute traits from a plurality of session attributes; and grouping attributes identified as sharing one or more common traits, the grouped attributes for use with the session persistence table.

20. The computer of claim 17 storing instructions, which when executed, further comprise:

using an autonomic learning algorithm for grouping attributes of the first record for improved querying or serialization or storage of the first record.

21. An article of manufacture comprising:

a non-transitory computer readable medium storing instructions thereon for managing application server session persistence, the instructions, which when executed, promoting actions comprising:

identifying one or more common attribute traits from a plurality of session attributes for an application server session running in an application server environment; and grouping attributes from the application server session in a session persistence table supporting the application server session, the grouped attributes identified as having one or more of the common attribute traits, wherein the common attribute traits for grouping attributes in the session persistence table include a shared range of time required to serialize the grouped attribute.

22. A method of session persistence storage comprising:

identifying one or more distinguishing attribute traits from a plurality of session attributes for an application server session running in an application server environment; and grouping attributes from the application server session in a session persistence table supporting the application server session, the grouped attributes identified as sharing one or more of the distinguishing attribute traits, wherein the distinguishing traits for grouping attributes in the session persistence table include a shared range of time required to serialize the grouped attribute.

* * * * *